Patented Sept. 7, 1943

2,328,588

UNITED STATES PATENT OFFICE 2,328,588

2-HYDROXY CARBAZOLE

William H. von Glahn, Loudonville, and Bernard W. Rottschaefer, Albany, N. Y., assignors to General Aniline & Film Corporation, New York, N. Y., a corporation of Delaware No Drawing. Application March 14, 1942, Serial No. 434,788

1 Claim. (Cl. 260—315)

This invention relates to a new method of making 2-hydroxy carbazole. Hitherto the methods used to manufacture this compound have been difficult and expensive. Our invention makes possible the direct synthesis of this material in a single operation from a new, inexpensive raw material.

It is known that carbazole can be made from 2-amino diphenyl by heating. It is further known that phenolic compounds when subjected to high temperatures tend to decompose or form ether type linkages. It is also known that mixtures of phenols and aromatic amines when heated together form diarylamines. It is therefore, reasonable to conclude that when 2-amino-4'-hydroxy diphenyl is heated to a high temperature similar reactions would occur resulting in decomposition, resinification or mixtures of complex compounds. We have discovered that under certain specific conditions this is not the case but that the reaction proceeds largely in only one direction to form 2-hydroxy carbazole. We have discovered that the temperature and the length of heating are the most important factors governing this reaction. The temperature should be between 600°–800° C. and the length of heating 0.5–5 seconds. Oxidizing agents such as air are preferably excluded.

The following example is typical of our process:

Example 2-amino-4'-hydroxy diphenyl in vapor form, mixed with nitrogen, is passed through a tube heated to an internal temperature of 700° C. at such a rate that it remains in the heated part of the tube for from about 0.5 to about 5.0 seconds. 2-hydroxy carbazole precipitates as a light colored solid when the exhaust gases are chilled. It may be purified by any of the known methods.

It is to be understood, of course, that the foregoing example is illustrative only, and that the process may be carried out successfully under conditions varying from those specifically described therein. The tube, for instance, may be empty or it may contain a catalyst such as asbestos, lime, chalk or other known catalysts. The 2-amino-4'-hydroxy diphenyl may be charged in the form of a solid or liquid.

We claim:

A process for the manufacture of 2-hydroxy carbazole which comprises heating 2-amino-4'-hydroxy diphenyl to a temperature of from about 600° C. to about 800° C. for a period of from about 0.5 to about 5.0 seconds.

WILLIAM H. von GLAHN.
BERNARD W. ROTTSCHAEFER.